United States Patent [19]

Mendelson

[11] 4,444,951

[45] Apr. 24, 1984

[54] POLYBLENDS OF THERMOPLASTIC POLYNORBORNENE NITRILE POLYMERS, STYRENEMALEIC ANHYDRIDE POLYMERS AND ACRYLONITRILE-BUTRADIENE-STYRENE POLYMERS

[75] Inventor: Robert A. Mendelson, South Hadley, Mass.

[73] Assignee: Monsanto Company, St. Louis, Mo.

[21] Appl. No.: 484,000

[22] Filed: Apr. 11, 1983

[51] Int. Cl.$^3$ .............................................. C08L 51/00
[52] U.S. Cl. ........................................ 525/74; 525/75; 525/77; 525/207; 525/210
[58] Field of Search ....................... 525/74, 75, 77, 207

[56] References Cited

U.S. PATENT DOCUMENTS

| | | | |
|---|---|---|---|
| 4,021,510 | 5/1977 | Ueshima et al. ..................... | 525/74 |
| 4,059,561 | 11/1977 | Arai et al. .............................. | 525/74 |
| 4,104,325 | 8/1978 | Ueshima et al. ..................... | 525/83 |
| 4,167,543 | 9/1979 | Liebig et al. ........................... | 525/74 |
| 4,197,376 | 4/1980 | Lee ........................................ | 525/84 |
| 4,298,716 | 11/1981 | Dufour .................................. | 525/74 |
| 4,305,869 | 12/1981 | Lee et al. .............................. | 525/74 |
| 4,310,637 | 1/1982 | Dewitt .................................. | 525/75 |

*Primary Examiner*—J. Ziegler
*Attorney, Agent, or Firm*—W. J. Farrington; P. D. Matukaitis; A. H. Cole

[57] ABSTRACT

Molding compositions are prepared from blends of (A) thermoplastic polynorbornene nitrile polymers; (B) styrene/maleic anhydride polymers; (C) at least one of the polymers selected from the group consisting of ABS polymers, MBS polymers, and styrene/acrylonitrile polymers. Component B, the styrene/maleic anhydride polymer may optionally contain a termonomer such as methylmethacrylate or acrylonitrile and a rubber component.

15 Claims, No Drawings

POLYBLENDS OF THERMOPLASTIC POLYNORBORNENE NITRILE POLYMERS, STYRENEMALEIC ANHYDRIDE POLYMERS AND ACRYLONITRILE-BUTRADIENE-STYRENE POLYMERS

BACKGROUND OF THE INVENTION

This invention relates to polyblends and specifically to polyblends of styrene-maleic anhydride (SMA) polymers and acrylonitrile-butadiene-styrene (ABS) polymers with certain thermoplastic polynorbornene nitrile (PNN) polymers capable of conferring on the SMA polymers and blends thereof with ABS improved impact properties.

SMA polymers of the type described herein and blends of the SMA polymers with ABS polymers are useful as molding and extrusion compounds. Certain end-use applications require impact strengths above those obtained with SMA polymers and blends thereof with ABS. Examples of such applications include the dashboard and instrument panels in automobiles, appliance housings and smaller molded parts for various uses. Other properties of the molded objects, such as distortion temperature under load and tensile strength, should be maintained within useful ranges.

The present invention provides a means of improving the impact properties of SMA polymers and blends thereof with ABS while maintaining other physical properties with useful ranges.

DESCRIPTION OF THE PRIOR ART

Polyblends of SMA and ABS type polymers are described in U.S. Pat. Nos. 4,197,376 and 4,305,869. Polynorbornene nitrile polymers (PNN) are disclosed in U.S. Pat. No. 3,856,758. Blends of PNN and ABS are disclosed in U.S. Pat. No. 4,104,325. PNN polymers are conventionally formed by the ring opening polymerization of cyano-substituted norbornene derivatives. Norbornene-nitrile (NN), variously named 5-cyanonorbornene-2 or 5-cyano-bicyclo [2,2,1] heptene-2, is a monomer prepared by the Diels Alder addition of acrylonitrile to cyclopentadiene. The diene is normally prepared by the thermal breakdown of dicyclopentadiene. Norbornene-nitrile is typically polymerized by a selected group of Ziegler catalysts prepared from organometallic compound and a tungsten, molybdenum or tantalum compound. The organometallic compound can conventionally be an organic aluminum compound or those disclosed in the catalytic systems of U.S. Pat. No. 3,856,758 hereby incorporated by reference.

SUMMARY OF THE INVENTION

The present invention provides a polyblend comprising:

A. from 3 to 90% by weight of a thermoplastic polynorbornene nitrile polymer;

B. from 5 to 70% by weight of a polymer of a vinylaromatic monomer and an unsaturated dicarboxylic acid anhydride monomer and optionally a termonomer, selected from the group consisting of $C_1$ to $C_3$ acrylates and methacrylates and unsaturated nitriles, wherein the relative amounts by weight of the monomers in the polymer are 50 to 85% of the vinylaromatic monomer, 15 to 35% of the dicarboxylic acid anhydride monomer and 0 to 20% of the termonomer; and wherein the monomers are polymerized in the presence of 0 to 35% by weight of a rubber having a glass transition temperature below 0° C.;

C. from 5 to 70% by weight of at least one polymer selected from the group consisting of (1) a grafted polymer composition comprising a matrix copolymer and a rubber substrate grafted with a superstrate copolymer wherein the copolymer comprises from 20 to 40 parts by weight of a monomer selected from the group consisting of methyl methacrylate and acrylonitrile and 80 to 60 parts by weight of a vinyl aromatic monomer wherein the substrate rubber has a glass transition temperature below 0° C., wherein the monomers are polymerized in the presence of and grafted onto the substrate rubber, wherein the weight percent of the rubber is in the range from 5 to 50% weight percent based on the weight of the grafted polymer composition; and (2) a polymer of a vinylaromatic monomer and an unsaturated nitrile in a weight ratio of 80:20 to 60:40 respectively; and wherein the weight percent for Components (A), (B), and (C) is based on the total amount of Components (A), (B), and (C) in the polyblend.

Thermoplastic polynorbornene nitrile polymers which are suitable for use as Component A in the practice of the present invention are defined below. Both PNN and rubber modified-polynorbornene nitrile (RM-PNN) can be used. Component A of the above formulation is preferably RM-PNN.

PNN is prepared by the ring opening polymerization of a 5-substituted norbornene-2 wherein one of the 5-substituents is a nitrile group and the other 5-substituent is chosen from the group consisting of hydrogen and $C_1$ to $C_6$ alkyls as described in U.S. Pat. No. 4,132,750. Such monomers are described in U.S. Pat. No. 3,856,758. The monomers may be represented by

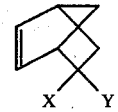

where X is a nitrile group and Y is the group consisting of hydrogen and $C_1$ to $C_6$ alkyls. RM-PNN as described in U.S. Pat. No. 4,132,750 is prepared by mechanically mixing the PNN at temperatures above the glass transition temperature of the PNN with a rubber component having a glass transition temperature below 0° C. to provide from 5 to 25% of rubber in the RM-PNN. The preferred PNN is prepared from 5-cyanonorbornene-2 and the preferred rubber is a butadiene rubber optionally containing acrylonitrile.

Component B of the above formulation is preferably a styrene/maleic anhydride polymer. The styrene may be replaced in whole or in part by other monoethylenically unsaturated monomers, such as monovinylidene aromatic hydrocarbons (e.g., styrene, an aralkylstyrene, such as the o-, m-, and p-methylstyrenes, 2,4-dimethylstyrene, the ar-ethylstyrenes, p-tert-butylstyrene, etc., an alpha-alkylstyrene, such as alphamethylstyrene, alpha-ethylstyrene, alpha-methyl-p-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.). Similarly the maleic anhydride can be replaced in whole or in part by another unsaturated dicarboxylic anhydride such as itaconic, aconitic or citraconic anhydride. Component B optionally contains a termonomer such as $C_1$ to $C_3$ alkyl acrylate or methacrylate, acrylonitrile or methacrylonitrile. The preferred termonomer, where present, is methyl methacrylate.

The proportions of the monomer preferably employed provide an anhydride content of from 15 to 35% by weight and a methyl methacrylate content of 5 to 15% by weight with the balance being styrene.

Rubber modified SMA polymers are prepared by polymerizing monomers of the type and amounts used to prepare Component B above, e.g., styrene, maleic anhydride and optionally a termonomer such as methyl methacrylate, in the presence of the rubber in such a way that the polymerizing monomers are grafted onto the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354.

The optional rubber modified SMA polymer contains from 5 to 35% by weight of a rubber component and preferably from 5 to 25% by weight of a rubber component. The rubber component is conventionally a diene rubber such as polybutadiene. Polymers of butadiene with a comonomer such as styrene or acrylonitrile which contain at least 60% and preferably 90% by weight of butadiene or a butadiene based block or radial-block rubber may also be used. Other rubbers such as EPDM rubber, polypentenamer, polyisoprene, polychloroprene, polyacrylate rubbers and the like can, if desired, also be used.

Component C of the above formulation consists of at least one polymer selected from the group of two components C(1) and C(2).

Component C(1) is typically an ABS or MBS type polymer, that is to say a diene rubber substrate grafted with styrene and either acrylonitrile or methyl methacrylate. The styrene may be replaced in whole or in part by other styrenic monomers such as described with reference to Component B above. The acrylonitrile may be replaced in whole or in part by methacrylonitrile. The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D-746-52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with one or more copolymerizable monoethylenically unsaturated monomers, such as monovinylidene aromatic hydrocarbons (e.g., styrene, an aralkylstyrene, such as the o-, m-, and p-methylstyrenes, 2,4-dimethylstyrene, the ar-ethylstyrenes, p-tert-butylstyrene, etc., an alpha-alkylstyrene, such as alphamethylstyrene, alphaethylstyrene, alpha-methyl-p-methylstyrene, etc.; vinyl naphthalene, etc.); ar-halo monovinylidene aromatic hydrocarbons (e.g., the o-, m-, and p-chlorostyrenes, 2,4-dibromostyrenes, 2-methyl-4-chlorostyrene, etc.); acrylonitrile; methacrylonitrile; alkyl acrylates (e.g., methyl acrylate, butyl acrylate, 2-ethylhexyl acrylate, etc.); the corresponding alkyl methacrylates; acrylamides (e.g., acrylamide, methacrylamide, N-butyl acrylamide, etc.); unsaturated ketones (e.g., vinyl methyl ketone, methylisopropenyl ketone, etc.); alpha-olefins (e.g., ethylene, propylene, etc.); pyridines; vinyl esters (e.g. vinyl acetate, vinyl stearate, etc.); vinyl and vinylidene halides (e.g., the vinyl and vinylidene chlorides and bromides, etc.) and the like. Such rubbers include those which may provide the substrate for rubber modified SMA polymers described below.

Component C(1) may be replaced in whole or in part by a rubber modified styrene-maleic anhydride polymer.

Component C(2) is typically a styrene/acrylonitrile polymer. The styrene may be replaced in whole or in part by other styrenic monomers as described with reference to Component B above. The acrylonitrile may be replaced in whole or in part by methacrylonitrile.

In addition to the above components the polyblends of the invention can advantageously contain other additives such as plasticizers, antioxidants, stabilizers, flameretardants, fibers, minerals, dyes, pigments and the like.

The components of the polyblend can be blended together by any conventional blending process. Usually however they are extrusion blended or compounded in a high intensity blender such as a Banbury Mixer.

Components B and C can be together provided by the formulations described in U.S. Pat. Nos. 4,305,689 and 4,197,376 and then blended with Component A.

The invention is now described with reference to the following examples which are for the purposes of illustration only and are not intended to imply any limitation on the scope of the invention. The components described below are blended in a number of different ratios and tested for various properties. All of the percentages are by weight unless otherwise designated.

COMPONENTS USED

ABS-1—prepared by the graft emulsion polymerization of styrene and acrylonitrile (AN), such that the weight ratio of monomer in the polymer is 73:27, in the presence of AN-butadiene copolymer rubber where the butadiene/AN is 93/7. ABS-1 contains 38% by weight of rubber.

The grafted polybutadiene has an average particle size in the range of from 0.09 to 0.14 micron measured as a weight average particle diameter with centrifugal photosedimentometer (CPSM) by the published procedure of Graves, M. J. et al "*Size Analysis of Sbusieve Powders Using a Centrifugal Photosedimentometer*", British Chemical Engineering 9:742-744 (1964). A Model 3000 Particle Size Analyzer from Martin Sweets Co., 3131 W. Market St., Louisville, KY is used.

ABS-2—prepared by a combination of graft suspension polymerization and graft emulsion polymerization of styrene and AN in a weight ratio of 73:27 in the presence of AN-butadiene copolymer rubber and butadiene rubber. ABS-2 contains 25% by weight of rubber and the grafted rubber has an average particle size in the range of 0.09 to 1.4 microns.

ABS-3—prepared by a combination of graft suspension polymerization and graft emulsion polymerization of styrene and AN in a weight ratio of 73:27 in the presence of AN-butadiene copolymer rubber and butadiene rubber. ABS-3 contains 31.7% by weight of rubber and the grafted rubber has an average particle size in the range of 0.09 to 2.6 microns.

SMAMM—a terpolymer prepared by polymerizing a monomer mixture of styrene, maleic anhydride and methyl methacrylate to produce a composition in which the above monomers are in the weight ratio of 67.3/25.7/7.0 respectively.

PNN—prepared by a ring-opening polymerization of 5-norbornene-2-carbonitrile. The polymer was obtained from Showa Denka, K.K., Tokyo, Japan.

RM-PNN—PNN with 7.8% by weight of ungrafted butadiene/acrylonitrile rubber.

RM-SMAMM-1—prepared by polymerizing a monomer mixture of styrene, maleic anhydride and methyl methacrylate in the presence of ungrafted butadiene/acrylonitrile rubber to produce a composition in which the above monomers are the weight proportion 58.3/22.7/6.0 respectively and which contains 13% rubber.

RM-SMAMM-2—prepared by polymerizing a monomer mixture of styrene, maleic anhydride and methyl methacrylate in the presence of ungrafted butadiene/acrylonitrile rubber to produce a composition in which the above monomers are the weight proportion 58.0/23.0/6.0 respectively and which contains 13% rubber.

SAN—prepared by polymerizing a monomer mixture of styrene and acrylonitrile to produce a SAN polymer having a weight ratio of 67.7/32.3.

The components used in the working examples are blended by double-pass extrusion on a 2.54 cm Killion extruder with a compound two-stage screw having a 24/1 L/D and a 2/1 compression ratio at 204° C. The resulting blends are injection molded on an Arburg Molding Machine at a barrel temperature of 254° C., a mold temperature of 71° C., and injection pressures of $4.13 \times 10^3$ to $8.27 \times 10^3$ KPa. The molded samples are subjected to the following tests:

Izod Impact (ASTM D-256 Method A) with sample dimensions 6.35 cm×1.27 cm×0.318 cm, with results given in Joules/meter (J/m);

DTUL (ASTM D-648) with sample dimensions 12.7 cm×1.27 cm×1.27 cm and the maximum fiber stress of 1820 KPa with results given in °C.

IDI—Multiaxial Inverted Dart Impact-A modification of the test as described in Society of Plastic Engineers National Technical Conference "Plastics in Surface Transportation" Nov. 12–14, 1974 Detroit, Mich. pg. 238. In the modified test, instead of the dart being attached to the slider and striking the sample, the sample holder is attached to the slider and strikes the instrumented dart. The rotary potentiometer is not used. The instrumented dart used is 1.27 cm in diameter, and the sample strikes the instrumental dart at a velocity of 111.76 m/min. The samples are injection molded into 7.62 cm×10.16 cm×0.254 cm and then are cut into 3.81 cm×5.08 cm×0.254 cm pieces for testing.

FDI-(ASTM D-3029 Procedure A) results given in Joules (J).

Tensile Modulus, Tensile Strength to Yield (Ty), and Elongation to Fail (Ef)-(ASTM D-638), results given in megapascals (MPa) for tensile modulus and Ty. Ef is given in (%). Type I specimens are used for the said method.

In Examples I-1 to I-10 various polyblends are prepared and tested and the results are tabulated in Tables 1 to 3. Control Examples, identified as C-1 to C-8, are included in Table 1 to 3 for comparison purposes. All examples are prepared using 0.3% by weight of Ethanox 330 based on the total weight of polymeric component (B). The amounts of the polymeric components (A), (B) and (C) used are parts by weight and, are calculated to add up to a 100 parts by weight total.

EXAMPLES I-1 TO I-6

In Examples I-1 to I-6, which are tabulated in Table 1, a 50/50 blend of SMAMM and ABS-3 is blended with varying amounts of PNN and RM-PNN. Comparing C-1 to I-1, a marked improvement in Izod and elongation to fail ($E_f$) is seen when 10% PNN is added to ABS/SMAMM. When the amount of PNN is increased to 50% (I-2), an even greater increase is seen in the Izod, and a dramatic increase is seen in the FDI. When 30% by weight of RM-PNN is added to ABS/SMAMM (I-3) a marked improvement in Izod and FDI is seen when compared to C-1 even though the total rubber content is lower (13.5 versus 15.9). I-4 and I-5 were blended at 177° C. and 204° C. respectively. There are small differences in the properties measured, but these differences may be explained by the different blending temperatures. I-4, I-5 and I-6 show a trend of improving Izod and FDI with small losses of DTUL by increasing RM-PNN content in the polyblend.

EXAMPLES I-7, I-8 and I-9

In these examples, which are tabulated in Table 2, RM-SMAMM, RM-PNN, and ABS are blended together. Comparing Control C-3 to Example I-7 shows that the addition of RM-PNN to RM-SMAMM gives an increased Izod, FDI and elongation to fail and a decreased DTUL. Comparing Controls C-5 and C-3, it can be seen that blending ABS with RM-SMAMM gives an improvement in FDI and Izod but a decrease in DTUL. Comparing Example I-8 to Example I-7 shows that the combination of RM-SMAMM, ABS and RM-PNN gives an increase in Izod and tensile modulus with a decrease in DTUL. Comparing Example I-9 to Control C-5, it is shown that the addition of RM-PNN to RM-SMAMM and ABS gives an increase in Izod, FDI, tensile strength to yield, and elongation to fail. Tensile modulus and DTUL stay the same.

TABLE 1

| | POLYBLENDS USING ABS/SMAMM | | | | | | | |
|---|---|---|---|---|---|---|---|---|
| | C-1 | I-1 | I-2 | C-2 | I-3 | I-4 | I-5 | I-6 |
| *ABS/SMAMM | 100 | 90 | 50 | 0 | 70 | 50 | 50 | 30 |
| PNN | 0 | 10 | 50 | 0 | 0 | 0 | 0 | 0 |
| RM-PNN | 0 | 0 | 0 | 100 | 30 | 50 | 50 | 70 |
| RUBBER (total) | 15.9 | 14.3 | 7.9 | 7.8 | 13.5 | 11.9 | 11.9 | 10.2 |
| DTUL (°C.) | 113 | 114 | 112 | 115 | 110 | 113 | 114 | 110 |
| IZOD (J/m) | 136 | 163 | 168 | 1198 | 342 | 624 | 721 | 868 |
| FDI (J) | 24.8 | 16.5 | 126 | 151** | 80 | 117 | 108** | 146 |
| TENSILE MOD × 10$^{-3}$ (MPa) | 2.41 | 2.07 | 2.07 | 1.58 | 2.14 | 2.14 | 1.99 | 1.86 |
| T$_y$ (MPa) | 32.4 | 34.4 | 41.3 | 40.0 | 35.1 | 37.2 | 35.8 | 38.6 |

TABLE 1-continued

| | POLYBLENDS USING ABS/SMAMM | | | | | | | |
|---|---|---|---|---|---|---|---|---|
| | C-1 | I-1 | I-2 | C-2 | I-3 | I-4 | I-5 | I-6 |
| $E_f(\%)$ | 26 | 32 | 43 | 200 | 63 | 59 | 57 | 125 |

*50% ABS-3
50% SMAMM (67.3/25.7/7.0)
**Measured as IDI and converted to FDI with a conversion factor: IDI × 3.99 = FDI

TABLE 2

| | POLYBLENDS USING RM-SMAMM | | | | | |
|---|---|---|---|---|---|---|
| | C-3 | I-7 | C-4 | I-8 | C-5 | I-9 |
| RM-SMAMM-1 | 0 | 0 | 0 | 0 | 50 | 25 |
| RM-SMAMM-2 | 100 | 60 | 80 | 40 | 0 | 0 |
| RMPNN | 0 | 40 | 0 | 50 | 0 | 50 |
| ABS-1 | 0 | 0 | 0 | 0 | 50 | 25 |
| ABS-2 | 0 | 0 | 20 | 10 | 0 | 0 |
| RUBBER (total) | 13 | 10.9 | 17.7 | 12.8 | 18.9 | 13.2 |
| DTUL (°C.) | 136 | 123 | 122 | 115 | 108 | 109 |
| IZOD (J/m) | 130 | 450 | 124 | 618 | 254 | 802 |
| FDI (J) | 16.3 | 126 | 28.5 | 126 | 58.3 | 140 |
| TENSILE MOD × $10^{-3}$ (MPa) | 1.93 | 1.72 | 1.93 | 1.93 | 1.72 | 1.72 |
| $T_y$ (MPa) | 29.6 | 31.7 | 31 | 35.1 | 28.2 | 33.1 |
| $E_f(\%)$ | 12 | 93 | 18 | 93 | 15 | 101 |

EXAMPLE I-10

Example I-10 which is tabulated in Table 3 shows improvement in Izod and elongation to fail when SMAMM, SAN and PNN are blended. Comparing Control C-6 to Control C-7 it is shown that the addition of PNN to SMAMM gives an increase in elongation to fail and a lower DTUL and tensile modulus at constant Izod. Comparing Example I-10 to Control C-7, it is shown that the addition of SAN to PNN and SMAMM gives an increase in Izod, tensile modulus, and elongation to fail with a decrease in DTUL. Comparing Controls C-6, C-7 and I-10, it is seen that all three components (A, B, and C) are necessary to achieve the desired combination of properties. Control C-8 illustrates the dramatic effect even a small amount (3.9% by weight) of rubber has on the properties.

TABLE 3

| | POLYBLENDS USING SAN | | | |
|---|---|---|---|---|
| | C-6 | C-7 | I-10 | C-8 |
| SMAMM | 100 | 60 | 30 | 50 |
| SAN | 0 | 0 | 30 | 0 |
| PNN | 0 | 40 | 40 | 0 |
| RM-PNN | 0 | 0 | 0 | 50 |
| Rubber (Total) | 0 | 0 | 0 | 3.9 |
| DTUL (°C.) | 125 | 116 | 102 | 127 |
| Izod (J/M) | 13.0 | 13.0 | 15.2 | 32.5 |
| Mod × $10^{-3}$ (MPa) | 3.51 | 2.82 | 2.89 | 2.55 |
| $T_y$ (MPa) | *NY | NY | NY | NY |
| $E_f(\%)$ | 1.1 | 1.7 | 2.0 | 3.5 |

*No Yield

What is claimed is:
1. A polyblend comprising:
A. from 3 to 90% by weight of a thermoplastic polynorbornene nitrile polymer wherein the polynorbornene nitrile polymer is prepared by the ring opening polymerization of a 5-substituted norbornene-2 wherein one of the 5-substituents is a nitrile group and the other 5-substituent is chosen from the group consisting of hydrogen and $C_1$ to $C_6$ alkyls;
B. from 5 to 70% by weight of a polymer of a vinylaromatic monomer and an unsaturated dicarboxylic acid anhydride monomer and optionally a termonomer, selected from the group consisting of $C_1$ to $C_3$ acrylates and methacrylates and unsaturated nitriles, wherein the relative amounts by weight of the monomers in the polymer are 50 to 85% of the vinylaromatic monomer, 15 to 35% of the dicarboxylic acid anhydride and 0 to 20% of the termonomer; and wherein the monomers are polymerized in the presence of 0 to 35% by weight of a rubber having a glass transition temperature below 0° C.;
C. from 5 to 70% by weight of at least one polymer selected from the group consisting of (1) a grafted polymer composition comprising a matrix copolymer and a rubber substrate grafted with a superstrate copolymer wherein the copolymer consists of from 20 to 40 parts by weight of a monomer selected from the group consisting of methyl methacrylate and acrylonitrile and 80 to 60 parts by weight of a vinyl aromatic monomer, wherein the substrate rubber has a glass transition temperature below 0° C., wherein the monomers are polymerized in the presence of and grafted onto the substrate rubber, wherein the weight percent of the rubber is in the range from 5 to 50% by weight based on the weight of the grafted polymer composition; and (2) a polymer consists of of a vinylaromatic monomer and an unsaturated nitrile in a weight ratio of 80:20 to 60:40 respectively;
and wherein the weight percent for Components (A), (B), and (C) is based on the total amount of Components (A), (B), and (C) in the polyblend.

2. A polyblend as in claim 1 wherein Component B is a styrene/maleic anhydride polymer.

3. A polyblend as in claim 1 wherein the grafted polymer of Component C is the polymerized monomers are acrylonitrile with styrene and the rubber substrate is butadiene rubber.

4. A polyblend comprising:
A. from 3 to 90% by weight of a thermoplastic polynorbornene nitrile polymer wherein the polynorbornene nitrile polymer is prepared by the ring opening polymerization of a 5-substituted norbornene-2 wherein one of the 5-substituents is a nitrile group and the other 5-substituent is chosen from the group consisting of hydrogen and $C_1$ to $C_6$ alkyls;
B. from 5 to 70% by weight of a styrene/maleic anhydride polymer comprising 50 to 85% by weight of styrene, 15 to 35% by weight of maleic anhydride and 0 to 20% of a methyl methacrylate termonomer;
C. from 5 to 70% by weight of at least one polymer selected from the group consisting of (1) a grafted polymer composition comprising a matrix copolymer and a rubber substrate grafted with a superstrate copolymer wherein the copolymer consists of from 20 to 40 parts by weight of a monomer selected from the group consisting of methyl methacrylate and acrylonitrile and 80 to 60 parts by weight of a vinyl aromatic monomer, wherein the substrate rubber has a glass transition temperature below 0° C., wherein the monomers are polymerized in the presence of and grafted onto the substrate rubber, wherein the weight percent of the rubber is in the range from 5 to 50% by weight based on the weight of the grafted polymer composition; and (2) a styrene and acrylonitrile polymer consists of 60 to 80% by weight of styrene and 20 to 40% by weight of acrylonitrile and wherein the weight ratio of the styrene/maleic anhydride polymer (B) to the grafted polymer composition (C) is in the range of 80:20 to 20:80;
and wherein the weight percent for Components (A), (B) and (C) is based on the total amount of Components (A), (B) and (C) in the polyblend.

5. A polyblend as in claim 4 wherein the polynorbornene nitrile polymer is in the range from 15 to 55% by weight and the weight ratio of the styrene/maleic anhydride polymer of Component B to the grafted polymer composition of Component C is in the range from 80:20 to 20:80.

6. A polyblend as in claim 4 wherein the styrene monomer of Component B is substituted by the 5 to 15% by weight of a methyl methacrylate termonomer and wherein the grafted polymer of Component C is the polymerized monomers are acrylonitrile with styrene and the rubber substrate is butadiene rubber.

7. A polyblend according to claim 1 comprising:
A. 3 to 90% by weight of the thermoplastic polynorbornene nitrile polymer;
B. 5 to 70% by weight of the styrene/maleic anhydride/methylmethacrylate polymer; and
C. 5 to 70% by weight of the grafted polymer is the polymerized monomers of acrylonitrile with styrene and the rubber substrate is butadiene rubber.

8. A polyblend according to claim 1 wherein the polymer of the vinyl aromatic monomer, the unsaturated dicarboxylic acid anhydride and optionally a termonomer selected from the group consisting of $C_1$ to $C_3$ alkyl acrylates or methacrylate, acrylonitrile or methacrylonitrile of Component B is prepared by polymerizing the monomers in the presence of the rubber component having a glass transition temperature below 0° C., to provide from 5 to 25% by weight of rubber in the polymer.

9. A polyblend of claim 1 wherein said thermoplastic polynorbornene nitrile polymer is prepared by the ring-opening polymerization of a 5-cyano-norbornene-2.

10. A polyblend of claim 9 wherein the 5- position of said norbornene is also substituted by a $C_1$ to $C_6$ alkyl group.

11. A polyblend of claim 9 wherein said polynorbornene nitrile polymer has the general structure:

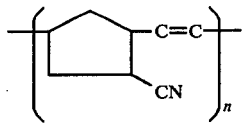

12. A polyblend according to claim 9 wherein the thermoplastic polynorbornene nitrile polymer of Component A is prepared by polymerizing the norbornene nitrile monomers and then blending with a rubber component having a glass transition temperature below 0° C., to provide from 5 to 25% of rubber in the product.

13. A polyblend according to claim 9 wherein the thermoplastic polynorbornene nitrile polymer of Component A is blended with butadiene/acrylonitrile rubber.

14. A polyblend comprising:
A. from 3 to 90% by weight of a thermoplastic polynorbornene nitrile polymer wherein the polynorbornene nitrile polymer is prepared by the ring opening polymerization of a 5-substituted norbornene-2 wherein one of the other 5-substituents is a nitrile group and the other 5-substituent is chosen from the group consisting of hydrogen and $C_1$ to $C_6$ alkyls;
B. from 5 to 70% by weight of a styrene/maleic anhydride polymer comprising 50 to 85% by weight of styrene, 15 to 35% by weight of maleic anhydride 0 to 20% of a methyl methacrylate termonomer;
C. from 5 to 70% by weight of a grafted polymer composition comprising a matrix copolymer and a polybutadiene rubber substrate grafted with a superstrate copolymer wherein the copolymer consists of from 20 to 40 parts by weight of acrylonitrile and 80 to 60 parts by weight of a styrene monomer, wherein the monomers are polymerized in the pesence of and grafted onto the substrate rubber, wherein the weight percent of the rubber is in the range from 5 to 50% by weight based on the weight of the grafted polymer composition;
and wherein the weight ratio of the styrene/maleic anhydride polymer (B) to the grafted polymer composition (C) is in the range of 80:20 to 20:80; and wherein the weight percent for Components (A), (B) and (C) is based on the total amount of Components (A), (B) and (C) in the polyblend.

15. Molded and extruded articles prepared from a polyblend comprising:
A. from 3 to 90% by weight of a thermoplastic polynorbornene nitrile polymer wherein the polynorbornene nitrile polymer is prepared by the ring opening polymerization of a 5-substituted norbornene-2 wherein one of the 5-substituents is a nitrile group and the other 5-substituent is chosen from the group consisting of hydrogen and $C_1$ to $C_6$ alkyls;
B. from 5 to 70% by weight of a polymer of a vinylaromatic monomer and an unsaturated dicarboxylic acid anhydride and optionally a termonomer, selected from the group consisting of $C_1$ to $C_3$ acrylates and methacrylates and unsaturated nitriles, wherein the relative amounts by weight of the monomers in the polymer are 50 to 85% by weight of a vinyl aromatic monomer, 15 to 35% of the dicarboxylic acid anhydride and 0 to 20% of the termonomer; and wherein the monomers are polymerized in the presence of 0 to 35% by weight of a rubber having a glass transition temperature below 0° C.; and
C. from 0 to 70% by weight of at least one polymer selected from the group consisting of (1) a grafted polymer composition comprising a matrix copolymer and a rubber substrate grafted with a superstrate copolymer wherein the copolymer consists of from 20 to 40 parts by weight of a monomer selected from the group consisting of methyl methacrylate and acrylonitrile and 80 to 60 parts by weight of a vinyl aromatic monomer, wherein the substrate rubber has a glass transition temperature below 0° C., wherein the monomers are polymerized in the presence of and grafted onto the substrate rubber, wherein the weight percent of the rubber is in the range from 5 to 50% by weight based on the weight of the grafted polymer composition; and (2) a polymer consists of a vinyl aromatic monomer and an unsaturated nitrile in a weight ratio of 80:20 to 60:40 respectively;

and wherein the weight percent for Componets (A), (B) and (C) is based on the total amount of Components (A), (B) and (C) in the polyblend.

* * * * *

UNITED STATES PATENT AND TRADEMARK OFFICE
CERTIFICATE OF CORRECTION

PATENT NO. : 4,444,951
DATED : Apr. 24, 1984
INVENTOR(S) : Robert A. Mendelson

It is certified that error appears in the above-identified patent and that said Letters Patent are hereby corrected as shown below:

In the Title, "STYRENEMALEIC ANHYDRIDE" should read
--STYRENE-MALEIC ANHYDRIDE--; "BUTRADIENE" should read
--BUTADIENE--

Column 4, line 45 "Sbusieve" should read --Subsieve--.
Column 8, lines 44 and 45 delete "the grafted polymer of
Component C is"; line 45 after "monomers" add --of the grafted
polymer of Component C--.
Column 9, line 10 "consists" should read --consisting--; line 41,
"discarboxylic" should read --dicarboxylic--.

Signed and Sealed this

Fourth Day of December 1984

[SEAL]

Attest:

GERALD J. MOSSINGHOFF

Attesting Officer    Commissioner of Patents and Trademarks